(12) United States Patent
Suzuki et al.

(10) Patent No.: US 8,413,628 B2
(45) Date of Patent: Apr. 9, 2013

(54) RING GEAR, INTERNAL COMBUSTION ENGINE-STARTING TORQUE-TRANSMISSION MECHANISM, AND METHOD OF MANUFACTURING RING GEAR

(75) Inventors: Tomoaki Suzuki, Nagoya (JP); Toshiaki Asada, Mishima (JP); Makoto Ishikawa, Nishikamo-gun (JP); Toshimitsu Shiba, Toyota (JP); Kazuhito Sakai, Makinohara (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 12/308,218

(22) PCT Filed: Jun. 19, 2007

(86) PCT No.: PCT/IB2007/002408
§ 371 (c)(1),
(2), (4) Date: Dec. 10, 2008

(87) PCT Pub. No.: WO2007/148228
PCT Pub. Date: Dec. 27, 2007

(65) Prior Publication Data
US 2009/0288295 A1    Nov. 26, 2009

(30) Foreign Application Priority Data
Jun. 23, 2006 (JP) ................. 2006-173762

(51) Int. Cl.
*F02N 11/00* (2006.01)
*F02N 15/02* (2006.01)
(52) U.S. Cl.
USPC ...................... 123/179.25; 192/42
(58) Field of Classification Search ............ 310/78, 310/92; 290/38, 46, 10; 192/42, 45, 104 R, 192/104 B, 104 C; 123/179, 1, 179.22, 179.24, 123/179.25, 179.28, 179.29
See application file for complete search history.

(56) References Cited

U.S. PATENT DOCUMENTS

| | | | |
|---|---|---|---|
| 5,117,954 A * | 6/1992 | Iga .......................... | 192/45.008 |
| 7,472,672 B2 * | 1/2009 | Asada et al. ............. | 123/179.25 |
| 2003/0048014 A1 * | 3/2003 | Souki et al. ............... | 310/92 |

(Continued)

FOREIGN PATENT DOCUMENTS
EP    0 469 599 A1    2/1992
EP    1 293 665 A2    3/2003
(Continued)

OTHER PUBLICATIONS

May 13, 2008 Office Action issued in Japanese Patent Application No. 2006-173762 (with English Translation).

*Primary Examiner* — Stephen K Cronin
*Assistant Examiner* — Sizo Vilakazi
(74) *Attorney, Agent, or Firm* — Oliff & Berridge, PLC

(57) ABSTRACT

A ring gear is formed by joining a race side-region formed body, a gear side-region formed body and an intermediate region formed body. Accordingly, it is possible to perform processing of an inner race portion of the race side-region formed body with none of the gear side-region formed body and the intermediate region formed body present. By causing the gear side-region formed body and the intermediate region formed body to absorb changes in design depending on the type of internal combustion engine, it is possible to standardize the size and the shape of the race side-region formed body for various engine types. Because the inner race portion, as well as a disposition surface and a contact surface for the seal rings are formed on the same race side-region formed body, it is possible to finish the surfaces with precise positional relationship.

14 Claims, 17 Drawing Sheets

U.S. PATENT DOCUMENTS

| | | | |
|---|---|---|---|
| 2008/0163842 A1* | 7/2008 | Forssell et al. | 123/179.25 |
| 2008/0163843 A1* | 7/2008 | Sakai et al. | 123/179.25 |

FOREIGN PATENT DOCUMENTS

| | | |
|---|---|---|
| JP | A-63-018185 | 1/1988 |
| JP | A-04-015352 | 1/1992 |
| JP | A-10-122107 | 5/1998 |
| JP | A-2001-153009 | 6/2001 |
| WO | WO 2006/016668 A1 | 2/2006 |
| WO | WO 2007/012946 A1 | 2/2007 |
| WO | WO 2007/105109 A2 | 9/2007 |

* cited by examiner

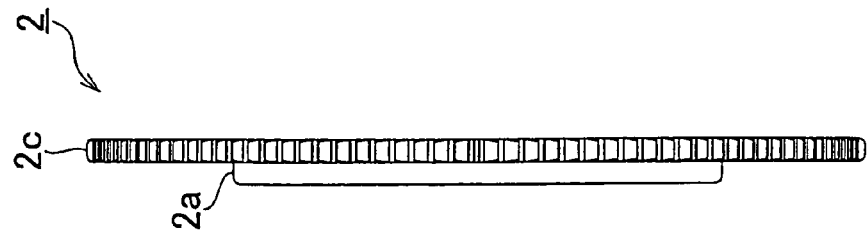
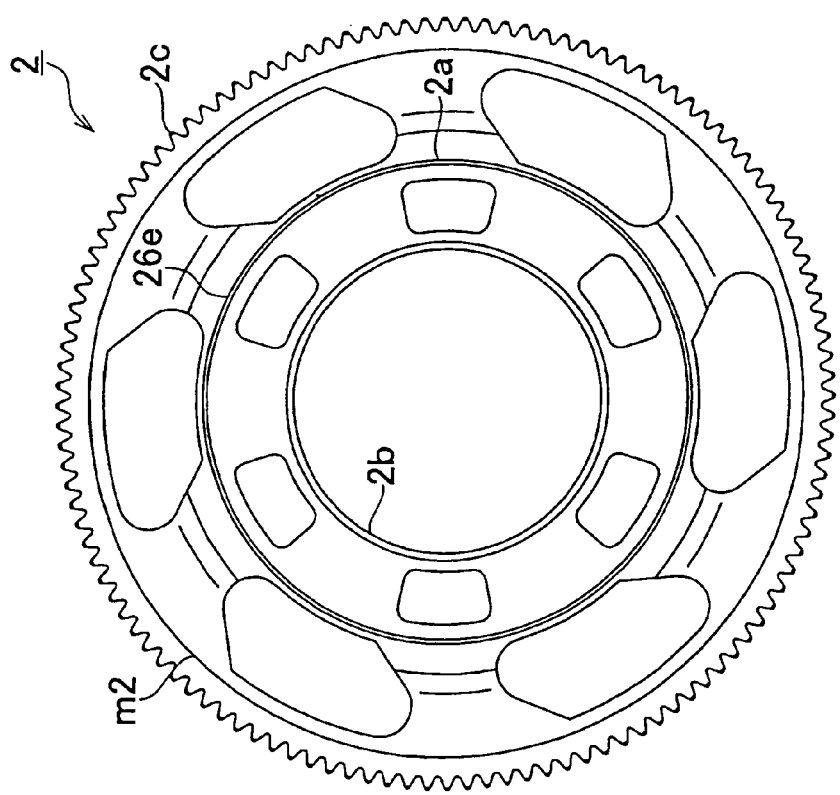

F I G . 4A
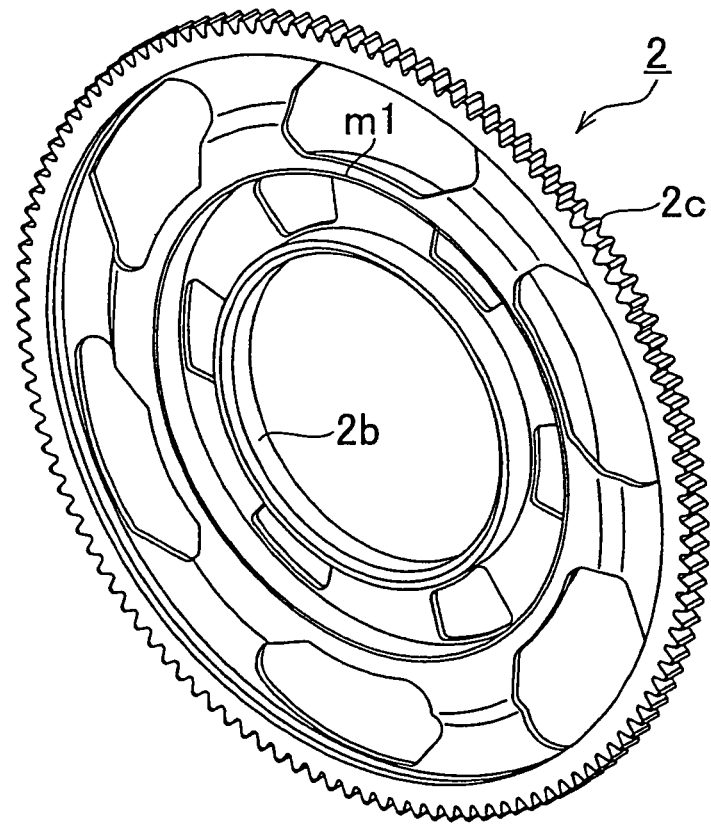

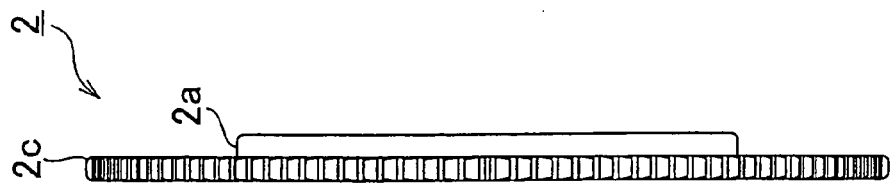
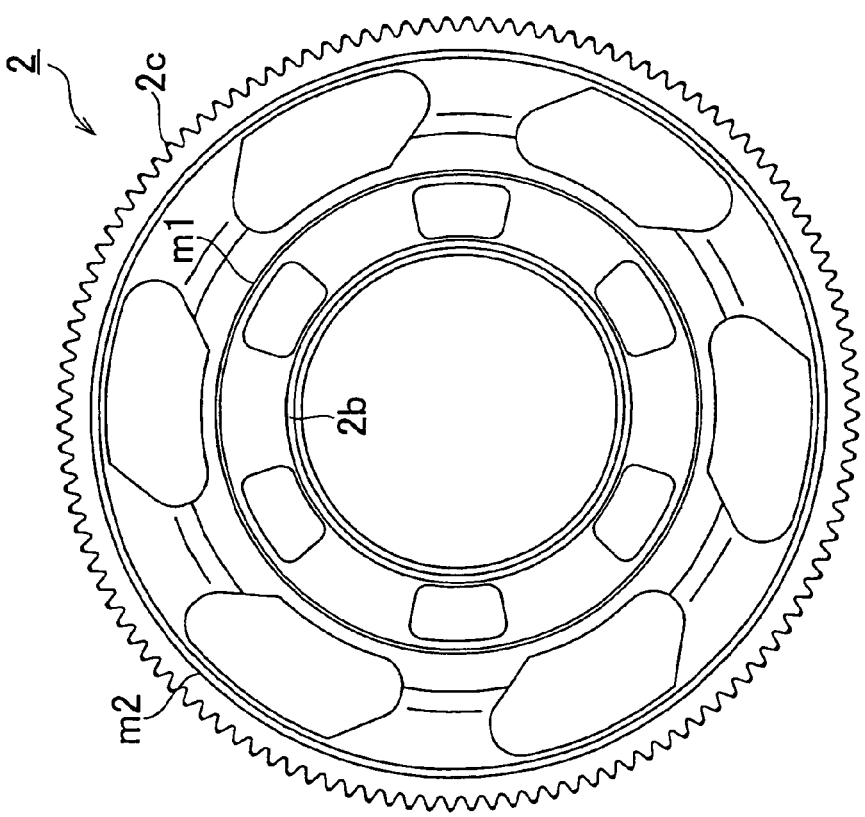

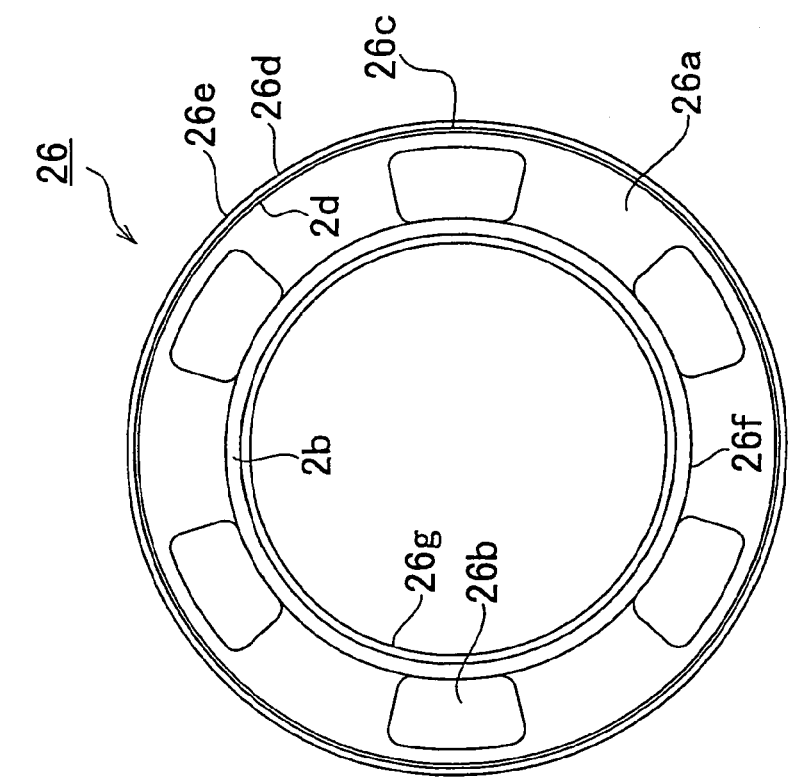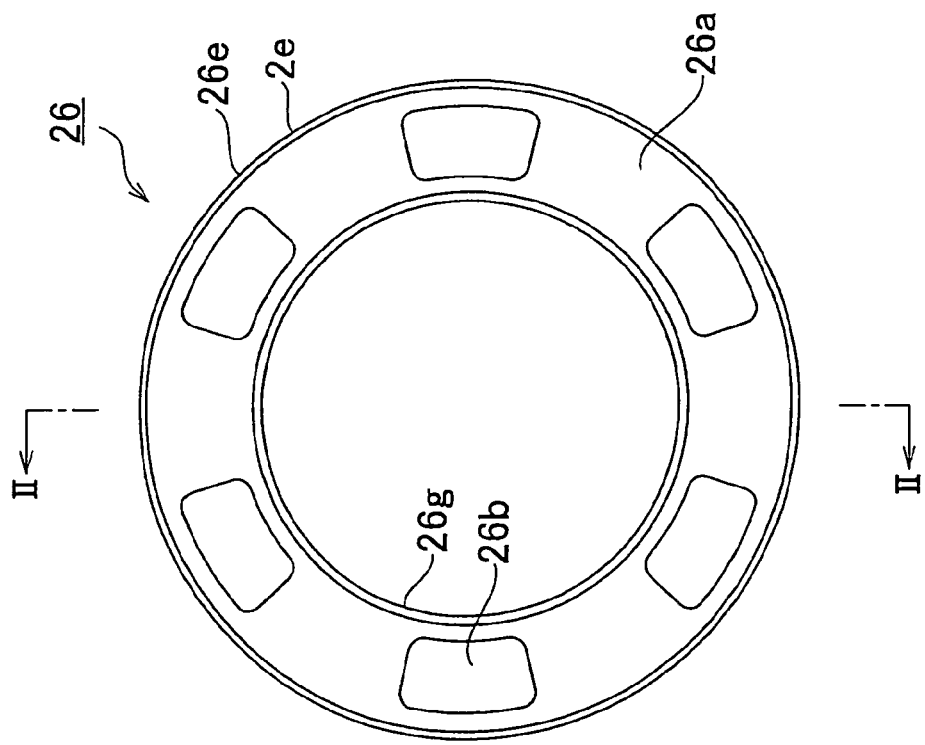

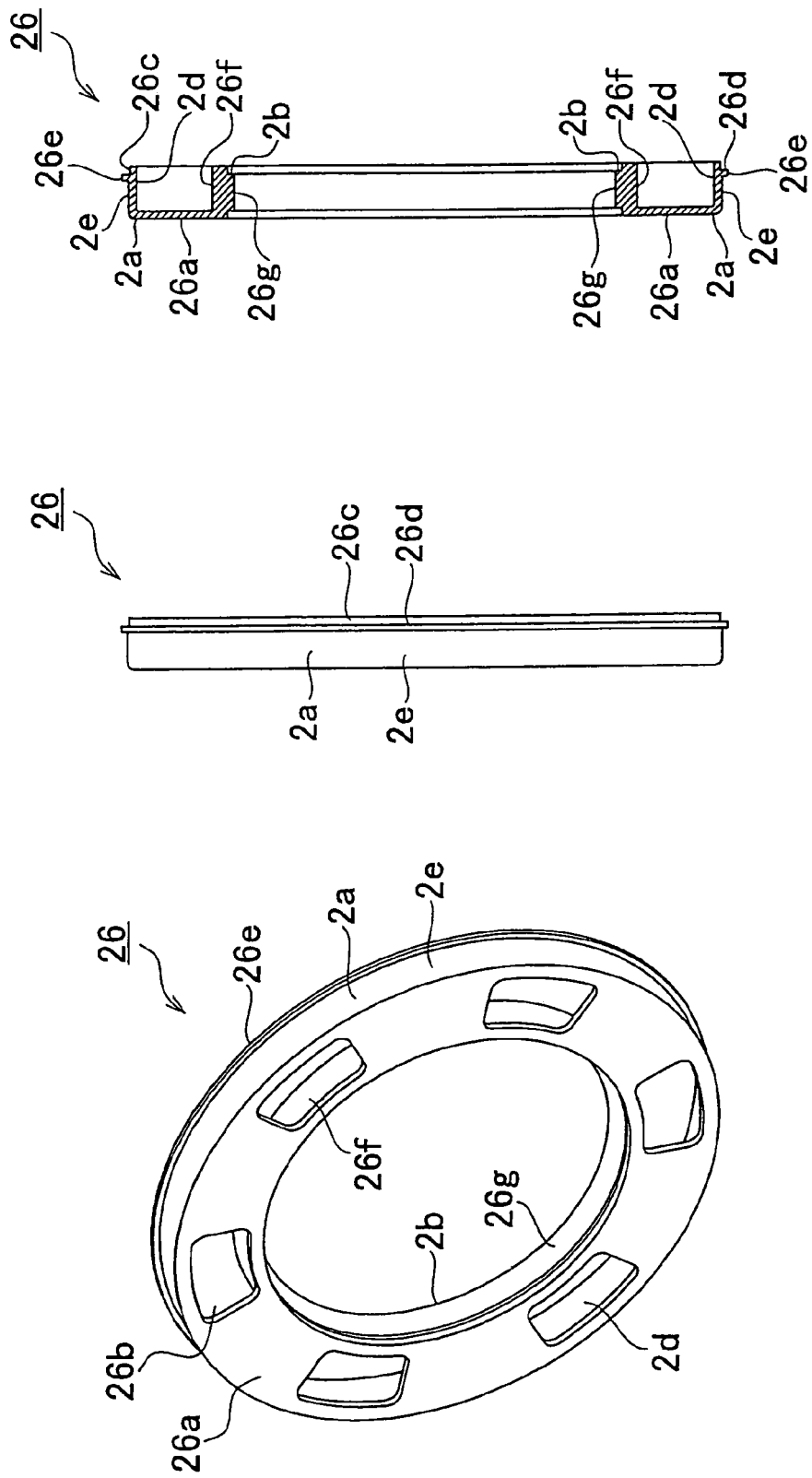

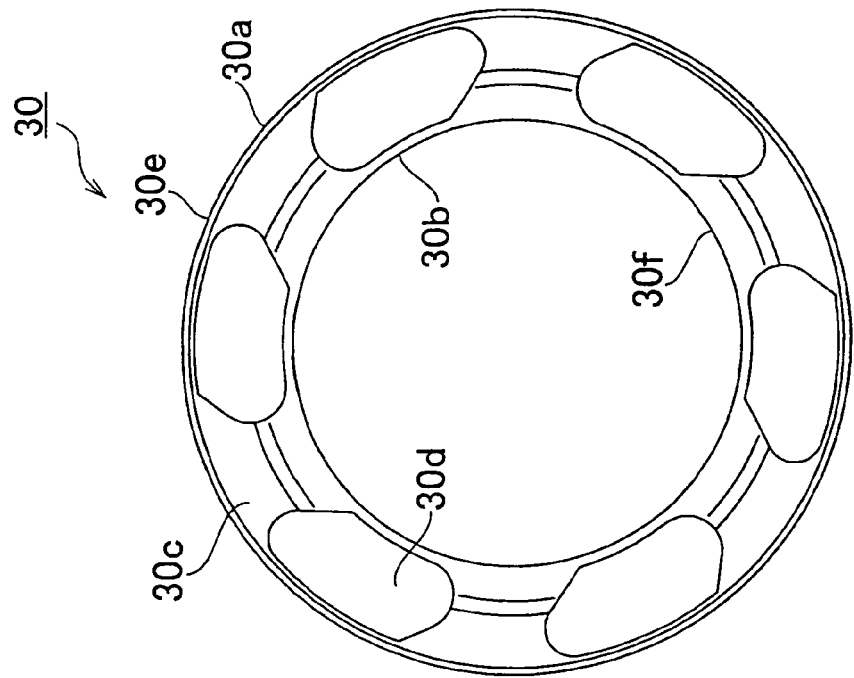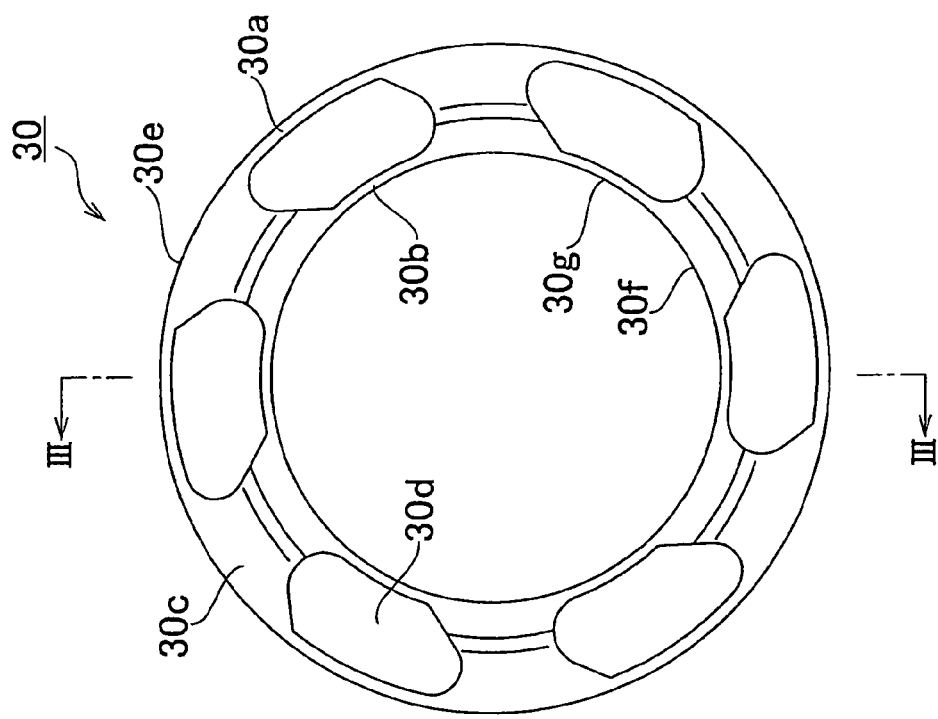

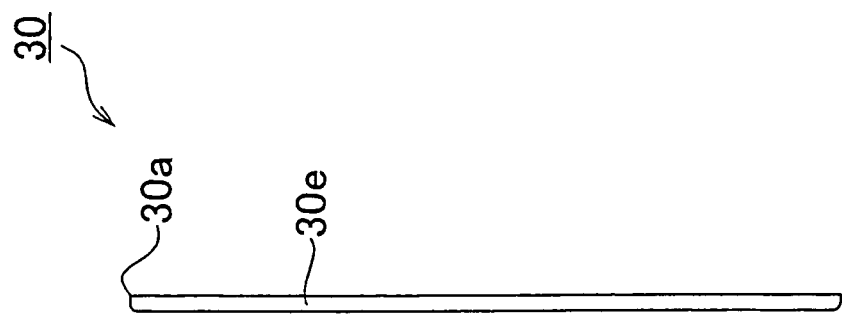
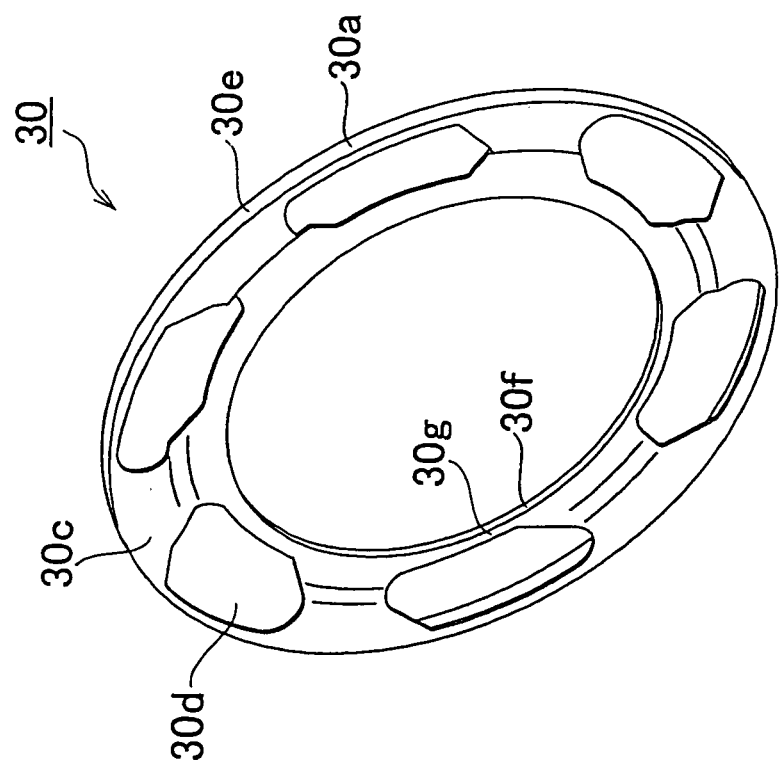

FIG. 9A
FIG. 9B
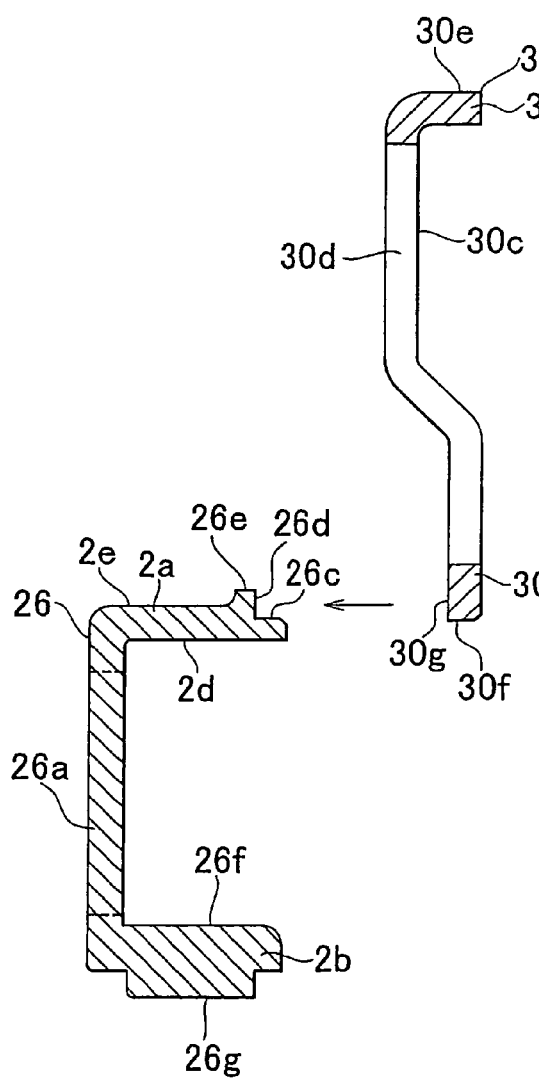
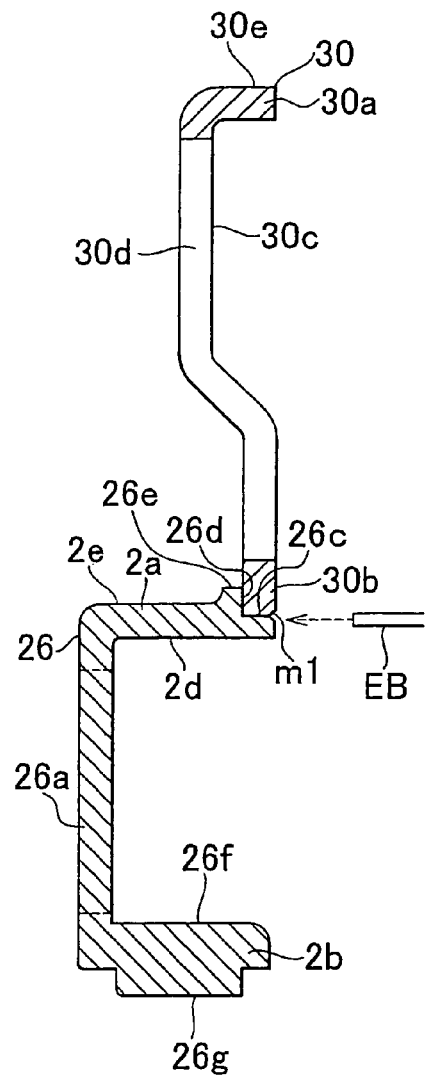

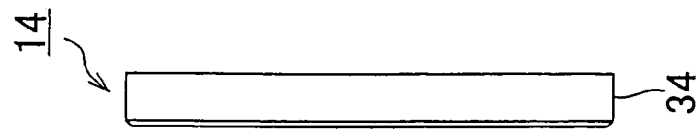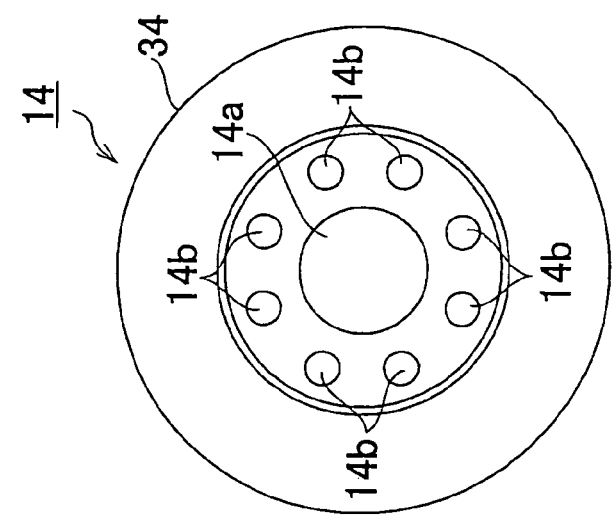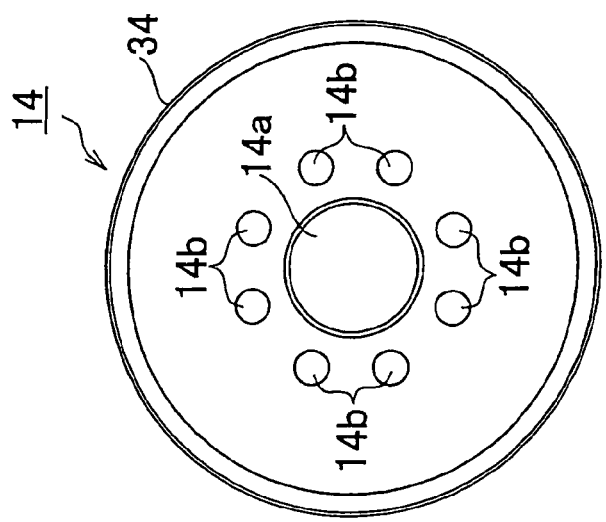

RING GEAR, INTERNAL COMBUSTION ENGINE-STARTING TORQUE-TRANSMISSION MECHANISM, AND METHOD OF MANUFACTURING RING GEAR

BACKGROUND OF THE INVENTION

1. Field of the Invention

The present invention relates to a ring gear that transmits starting torque output from a starter motor to a crankshaft side member, which rotates with a crankshaft of an internal combustion engine, through a one-way clutch, an internal combustion engine-starting torque-transmission mechanism using the ring gear, and relates to a method of manufacturing the ring gear.

2. Description of the Related Art

In order to start an internal combustion engine, an internal combustion engine-starting torque-transmission mechanism that cranks the engine using torque from a starter motor via gear mesh between a pinion and a ring gear is used. As the internal combustion engine-starting torque-transmission mechanism, a mechanism is already available in which a one-way clutch is disposed on a path through which starting torque is transmitted from a ring gear to a crankshaft (see Japanese Patent Application Publication No. 10-122107 (JP-A-10-122107) (page 3, FIG. 1), and Japanese Patent Application Publication No. 63-18185 (JP-A-63-18185) (page 2, FIG. 2), for example). With this configuration, it is possible to transmit torque from the starter motor to the internal combustion engine when the internal combustion engine is started, and it is possible to stop rotation of the starter motor after engine start is completed, with the mesh between the pinion and the ring gear maintained. That is, it is possible to construct an internal combustion engine-starting torque-transmission mechanism of constant-mesh type.

In such an internal combustion engine-starting torque-transmission mechanism using a one-way clutch, it is necessary to form one race portion of the one-way clutch, with which sprags or the like are engaged, in a ring gear, and to finish the surface of the race with high precision. In addition, in order to provide sealing against lubricating oil supplied to the one-way clutch, it is necessary to form a disposition surface on which a seal ring is disposed, or a contact surface with which a seal ring is in contact, and to finish the disposition surface or the contact surface with high precision.

However, it becomes necessary to change the size and the shape of the ring gear depending on the type of internal combustion engine, and, in some cases, using the same processing apparatuses and processing procedures may cause insufficiency in precision. Accordingly, in order to constantly carry out processing of the ring gear with high precision independently of the type of internal combustion engine, relatively significant changes in the processing apparatuses and processing procedures have to be made depending on the type of internal combustion engine, which causes a problem of an increase in manufacturing cost.

SUMMARY OF THE INVENTION

The present invention provides a ring gear with which, even when the size and the shape of a ring gear are different depending on the type of internal combustion engine, changes in processing apparatuses and processing procedures are minimized, and with which processing precision is not degraded. The present invention also provides a method of manufacturing the ring gear, and an internal combustion engine-starting torque-transmission mechanism that includes the ring gear.

A ring gear according to a first aspect of the present invention relates to a ring gear that transmits starting torque output from a starter motor to a crankshaft side member, which rotates with the crankshaft of an internal combustion engine, through a one-way clutch. The ring gear includes: a plurality of regionally formed bodies that are separately formed, corresponding to at least two regions that include a race side region including one race portion of the one-way clutch, and a gear side region to which the starting torque is transmitted from the starter motor via gear mesh, wherein a whole shape of the ring gear is radially divided into the at least two regions; and an inter-region joint portion joins the regionally formed bodies.

The ring gear is formed by joining the regionally formed bodies that are separately formed corresponding to the regions present along the radial direction, at the respective inter-region joint portions. Accordingly, with regard to at least the regionally formed body corresponding to the race side region, it is possible to process the race portion independently of the other regionally formed bodies, which include the regionally formed body corresponding to the gear side region. Thus, processing of the race portion is performed on a regionally formed body of relatively small size. For this reason, even when the size and the shape of the regionally formed body are different depending on the type of internal combustion engine, the difference is within a relatively narrow range, and it is therefore possible to minimize changes in processing apparatuses and processing procedures.

In particular, by causing the other regionally formed bodies, which include the regionally formed body corresponding to the gear side region, to absorb the difference depending on the type of engine, it is possible to standardize the size and the shape of the regionally formed body corresponding to the race side region for various engine types.

Thus, it is possible to provide a ring gear with which, even when a ring gear of a different size and the shape is used to suit the type of internal combustion engine, changes in processing apparatuses and processing procedures are minimized, and degradation in processing precision is not caused.

The regionally formed bodies may be formed to correspond with the race side region, the gear side region, and an intermediate region between the race side region and the gear side region, wherein the whole shape of the ring gear is divided into the three regions.

When regionally formed bodies corresponding to the three regions into which the whole shape is divided are formed in this way, two regionally formed bodies are present other than the regionally formed body corresponding to the race side region, and these two regionally formed bodies are also regionally formed bodies having a relatively small size. Accordingly, even when the size and the shape of the ring gear are different depending on the type of internal combustion engine, it is possible to minimize changes in respective processing apparatuses and processing procedures, and therefore, to minimize changes in processing apparatuses and processing procedures as a whole. Thus, it is possible to provide a ring gear with which degradation in processing precision is not caused.

A disposition surface on which a first seal ring is disposed or a contact surface with which the first seal ring is in contact may be formed on the race side-region formed body, which corresponds to the race side region, the first seal ring providing sealing against oil between the race side-region formed body and the crankshaft side member.

The race side-region formed body includes the race portion of the one-way clutch, and the disposition surface on which the seal ring is disposed, or the contact surface with which the seal ring is in contact, the seal ring providing sealing against oil between the race side-region formed body and the crankshaft side member. When the disposition surface or the contact surface for the seal ring are formed in the ring gear, it is necessary to form the disposition surface or the contact surface for the seal ring with high precision as in the case of the race portion of the one-way clutch, and, in addition, there is little tolerance for deviating from a coaxial alignment of the disposition surface or the contact surface with the race portion.

Because the race portion, and the disposition surface or the contact surface for the seal ring are formed on the same race side-region formed body, it is possible to process the race portion, and the disposition surface or the contact surface for the seal ring separately from the other regionally formed bodies, which include the regionally formed body corresponding to the gear side region. Thus, the race portion, and the disposition surface or the contact surface for the seal ring may be processed on the race side-region formed body that has a relatively small size. In addition, because the race portion, and the disposition surface or the contact surface for the seal ring are formed on the same regionally formed body, it is possible to finish the surfaces with a precise positional relationship between the race portion and the disposition surface or the contact surface.

Accordingly, when the disposition surface or the contact surface for the seal ring for providing sealing against oil between the race portion and the crankshaft side member is processed, even if the size and the shape of the ring gear are different depending on the type of internal combustion engine, it is possible to minimize changes in processing apparatuses and processing procedures, and to provide an ring gear with which degradation in processing precision is not caused.

A disposition surface on which a second seal ring is disposed or a contact surface with which the second seal ring is in contact may be formed on the race side-region formed body corresponding to the race side region, the second seal ring providing sealing against oil between the race side-region formed body and an internal combustion engine body-side member.

Formed on the race side-region formed body are the race portion of the one-way clutch, and the disposition surface or the contact surface for the seal ring for providing sealing against oil between the race side-region formed body and the internal combustion engine side member. Also in this case, the race portion, and the disposition surface or the contact surface for the seal ring are formed in or on the same race side-region formed body, and therefore, it is possible to process the race portion, and the disposition surface or the contact surface for the seal ring with none of the other regionally formed bodies present, which include the regionally formed body corresponding to the gear side region. Accordingly, processing is performed on the race side-region formed body that has a relatively small size. In addition, because the race portion and the disposition surface or the contact surface for the seal ring are formed in or on the same regionally formed body, it is possible to finish the surfaces with precise positional relationship between the race portion and the disposition surface or the contact surface for the seal ring.

Thus, even when the size and the shape of the ring gear are different depending on the type of internal combustion engine, it is possible to minimize changes in processing apparatuses and processing procedures when the race portion, and the disposition surface or the contact surface for the seal ring for providing sealing against oil between the race side-region formed body and the internal combustion engine side member are processed. As a result, it is possible to provide a ring gear with which degradation in processing precision is not caused.

In particular, when the race portion, and the disposition surface(s) and/or the contact surface(s) for the seal rings, one of which provides sealing against oil between the race side-region formed body and the crankshaft side member, and the other of which provides sealing against oil between the race side-region formed body and the internal combustion engine side member are formed in or on the race side-region formed body, it is possible to further effectively minimize changes in processing apparatuses and processing procedures. As a result, it is possible to provide a ring gear with which degradation in processing precision is not caused.

The race side-region formed body corresponding to the race side region may have a cylindrical portion extending parallel to the rotation axis, wherein the cylindrical portion is positioned further outward than the one race portion of the one-way clutch, the inner circumferential surface of the cylindrical portion may be the disposition surface or the contact surface for the first seal ring providing sealing against oil between the race side-region formed body and the crankshaft side member, and the outer circumferential surface of the cylindrical portion may be the disposition surface or the contact surface for the second seal ring providing sealing against oil between the race side-region formed body and the internal combustion engine body-side member.

In this way, the race side-region formed body is provided with the cylindrical portion, and the inner and outer circumferential surfaces of the cylindrical portion are each the disposition surface or the contact surface for the seal rings. Also in this case, even when the size and the shape of the ring gear are different depending on the type of internal combustion engine, it is possible to minimize changes in processing apparatuses and the processing procedures. As a result, it is possible to provide a ring gear with which degradation in processing precision is not caused.

An outermost periphery of the race side-region formed body may be the disposition surface or the contact surface for any one of the first and second seal rings, and an innermost edge portion of another regionally formed body may be joined to an edge portion of the outermost periphery through the inter-region joint portion.

With regard to the inter-region joint portion joining the race side-region formed body and another regionally formed body that is joined to the race side-region formed body, the outermost periphery of the race side-region formed body is the disposition surface or the contact surface for the seal ring, and the innermost edge portion of another regionally formed body is joined to the edge portion of the outermost periphery through the inter-region joint portion. Accordingly, the ring gear finally constructed in this way has the following advantages. Specifically, even when the size and the shape of the ring gear ate different depending on the type of internal combustion engine as described above, it is possible to minimize changes in processing apparatuses and processing procedures, and degradation in processing precision is not caused.

At least one inter-region joint portion may be formed by welding. In this way, joining is easily carried out by welding. Even when the size and the shape of the ring gear are different depending on the type of internal combustion engine as described above, it is possible to minimize changes in processing apparatuses and processing procedures, in performing such a joining process. Thus, it is possible to provide a ring gear with which degradation in processing precision is not caused.

The welding may be such that a contact interface between the regionally formed bodies to be welded is partially left unwelded. Also if the ring gear is welded with the contact interface between the regionally formed bodies partially unwelded, even when a ring gear of a different size and shape is changed to suit the type of internal combustion engine as described above, it is possible to minimize changes in processing apparatuses and processing procedures, and degradation in processing precision is not caused.

In addition, when the interfaces between the regionally formed bodies include an unwelded portion, the noise, such as the gear mesh sound produced at the gear side region when starting torque from the starter motor is transmitted, is transformed into thermal energy at the unjoined contact interface, whereby the noise is absorbed. In this way, it is possible to reduce noise at the time of engine start.

The crankshaft side member may include the other race portion of the one-way clutch, and the one-way clutch may be formed so that the other race portion radially faces the one race portion of the one-way clutch in the race side region.

Examples of the two race portions of the one-way clutch include one in which the two race portions radially face each other in this way.

The one race portion may be disposed radially inside the other race portion.

The two race portions of the one-way clutch may be configured so that the race portion on the ring gear side is disposed radially inside the race portion of the crankshaft side member.

If the ring gear is installed in the internal combustion engine, the ring gear may always mesh with the pinion of the starter motor.

Because the one-way clutch is disposed between the crankshaft side member and the ring gear, it is possible to stop the ring gear and the starter motor after starting of the internal combustion engine is completed despite the constant-mesh of the pinion and the ring gear.

A second aspect of the present invention is an internal combustion engine-starting torque-transmission mechanism for transmitting starting torque from a starter motor to a crankshaft of an internal combustion engine. Wherein, the mechanism using any one of the ring gears according to the first aspect of the present invention.

With this configuration, it is possible to allow the internal combustion engine-starting torque-transmission mechanism to have the same operations and effects as those of the first aspect of the present invention described above.

A ring gear manufacturing method according to a third aspect of the present invention is a method of manufacturing the ring gear-according to the first aspect of the present invention, the method including: forming all the regionally formed bodies, wherein at least the race side-region formed body corresponding to the race side region has a common shape independently of the type of internal combustion engine, and at least one of the regionally formed bodies other than the race side-region formed body has a shape adapted to the internal combustion engine of a particular type; and joining the regionally formed bodies by a joining process.

In the ring gear described above, all the regionally formed bodies are formed so that at least the race side-region formed body has a common shape independently of the type of internal combustion engine, and at least one of the other regionally formed bodies has a shape adapted to the internal combustion engine of a particular type. Then, the regionally formed bodies are joined by a joining process or processes.

The ring gear manufactured by the method has the following advantages. Specifically, even when the size and the shape of the ring gear are different depending on the type of internal combustion engine, it is possible to minimize changes in processing apparatuses and processing procedures, and degradation in processing precision is not caused.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIGS. 3A to 3C are diagrams for explaining a configuration of the ring gear according to the embodiment;

FIGS. 4A to 4C are diagrams for explaining the configuration of the ring gear according to the embodiment;

FIGS. 6A to 6E are diagrams for explaining a configuration of a race side-region formed body according to the embodiment;

FIGS. 7A to 7D are diagrams for explaining a configuration of an intermediate region formed body according to the embodiment;

FIGS. 9A and 9B are diagrams for explaining a process of joining the race side-region formed body and the intermediate region formed body according to the embodiment;

FIGS. 12A to 12E are diagrams for explaining a configuration of an outer race member according to the embodiment.

DETAILED DESCRIPTION OF EXAMPLE EMBODIMENTS

Figure 1:
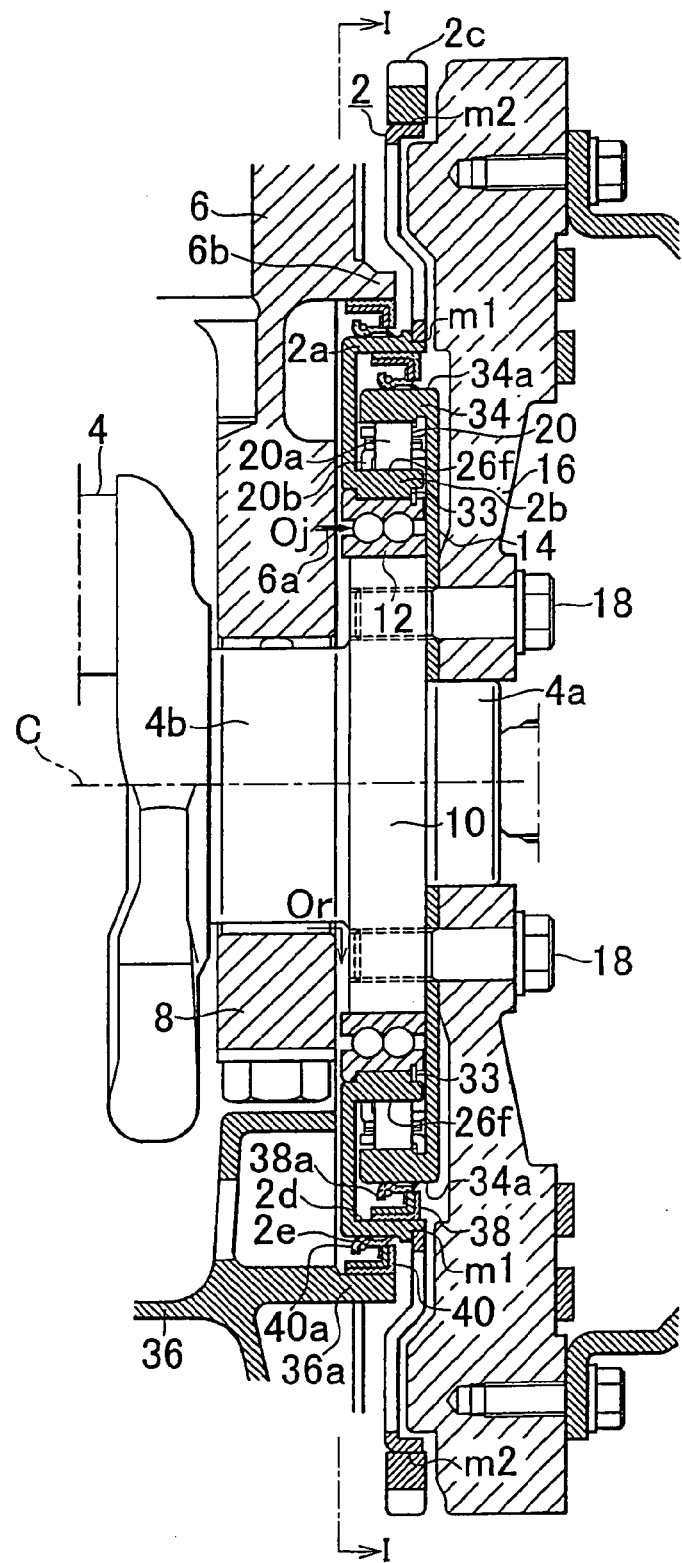
FIG. 1 is a longitudinal sectional view of an internal combustion engine-starting torque-transmission mechanism for a vehicular internal combustion engine in which a ring gear according to an embodiment is used.
Figure 2:
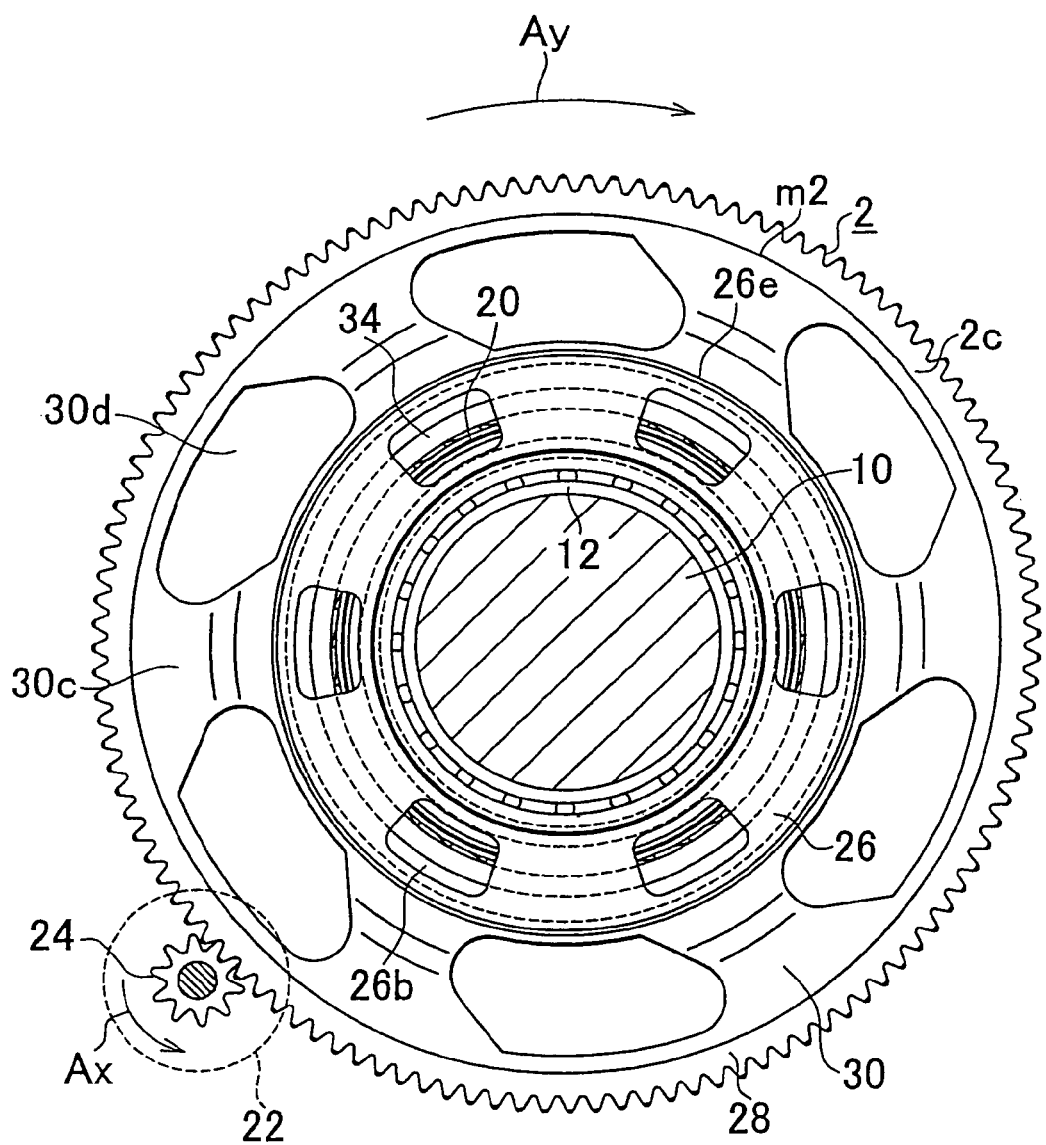
FIG. 2 is a sectional view on the plane I-I of FIG. 1.

FIG. 1 shows the longitudinal section of an internal combustion engine-starting torque-transmission mechanism for a vehicular internal combustion engine that includes a ring gear 2 according to an embodiment of the present invention. The internal combustion engine-starting torque-transmission mechanism is provided near a rear end portion 4a of a crankshaft 4. The rear end portion 4a of the crankshaft 4 is positioned on the side from which the rotational driving force from the internal combustion engine is transmitted to a clutch or a torque converter. That is, the words, "front" and "rear" herein indicate directions along the axis of the crankshaft in relation to the internal combustion engine. FIG. 2 is a sectional view on the vertical plane I-I shown in FIG. 1, showing a configuration of a portion on the right side of the plane I-I (the rear side with respect to the internal combustion engine).

A cylinder block 6 and a bearing ladder 8 constitute a journal bearing portion. The crankshaft 4 is rotatably supported by the cylinder block 6 at a journal 4*b* thereof. Thus, the crankshaft 4 is positioned in a state where part of the crankshaft 4 on the rear end portion 4*a* side horizontally protrudes from a rear portion of the cylinder block 6. The ring gear 2 is fitted onto the peripheral surface of a large diameter portion 10 formed between the rear end portion 4*a* and the journal 4*b* of the crankshaft 4 with a rolling bearing, which is herein a ball bearing 12, interposed between the peripheral surface of the large diameter portion 10 and the ring gear 2. An outer race member 14, which may be regarded as the crankshaft side member, and a flywheel (or driveplate) 16 are fixed on the rear side surface of the large diameter portion 10 with bolts 18. The outer race member 14 integrally rotates with the crankshaft 4 together with the flywheel 16.

Figure 3A:
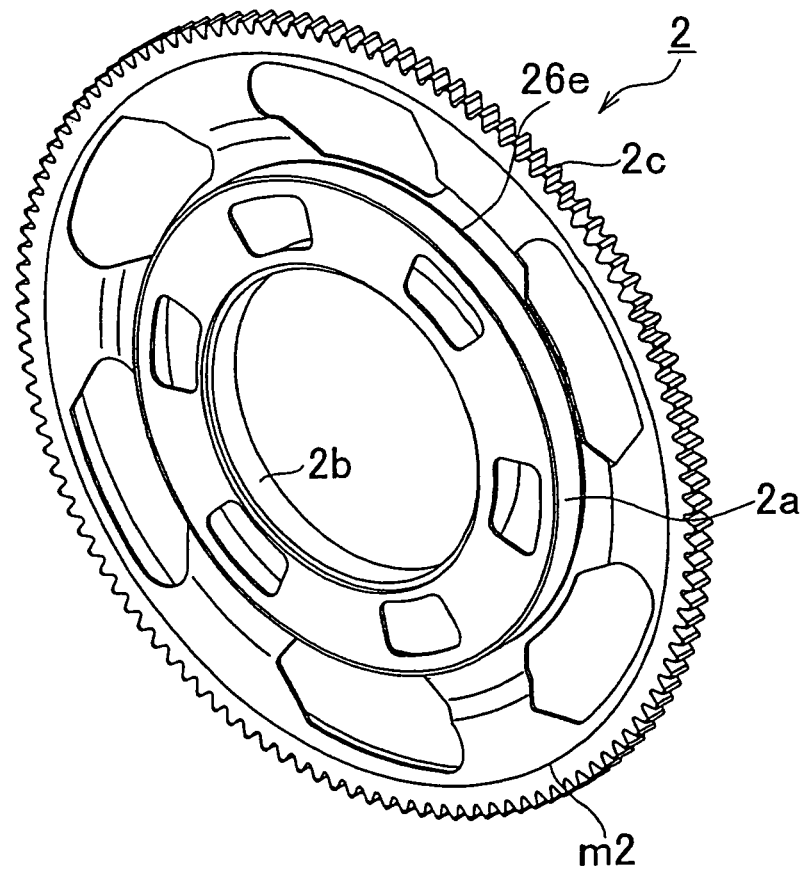

The ring gear 2 has a large opening at the center thereof as shown in FIGS. 3A to 3C, and FIGS. 4A to 4C, and is bent at a right-angle at a radial position all along the circumference. The bent portion is formed in the form of a cylindrical portion 2*a*, which is parallel to the rotation axis of the ring gear 2. FIG. 3A is a perspective view when viewed from a frontal position, FIG. 3B is a front view, and FIG. 3C is a right side view. FIG. 4A is a perspective view when viewed from a rear position, FIG. 4B is a rear view, and FIG. 4C is a left side view.

A cylindrical inner race portion 2*b*, which may be regarded as a race portion, for a one-way clutch 20 (FIG. 1) is provided on the inner edge around the opening at the center of the ring gear 2. A ring-like gear portion 2*c* is provided on the outer side of the ring gear 2. The ring gear 2 is, at the surface of the inner race portion 2*b* on the side opposite to the surface on which the one-way clutch 20 is constructed, that is, on the center side (on the rotation axis C side), fitted onto the periphery of the large diameter portion 10 of the crankshaft 4 with the ball bearing 12 interposed between the periphery of the large diameter portion 10 and the ring gear 2 as described above. When the one-way clutch 20 is in a disengaged state, the ring gear 2 freely rotates independently of the rotation of the crankshaft 4.

As shown in FIG. 2, the gear portion 2*c* of the ring gear 2 is always engaged with a pinion 24, which is rotated by a starter motor 22. The gear portion 2*c* of the ring gear 2 receives torque from the starter motor 22 through the pinion 24 that rotates in the direction indicated by the arrow Ax as shown in FIG. 2 when the internal combustion engine is started. As a result, the ring gear 2 rotates in the direction indicated by the arrow Ay.

Figure 5:
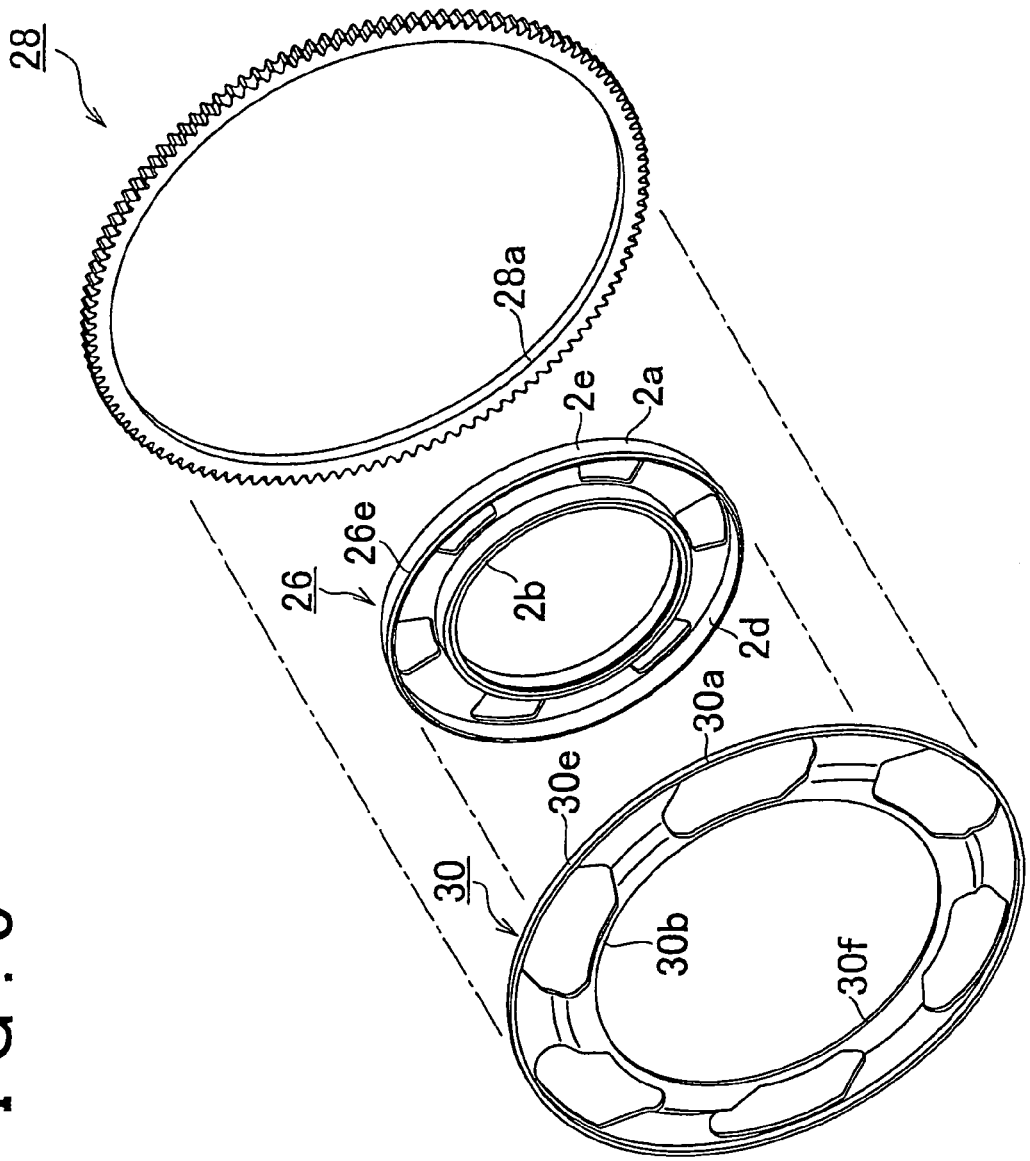
FIG. 5 is an exploded perspective view of the ring gear according to the embodiment.

As shown by the exploded perspective view (a perspective view when viewed from a rear position) of FIG. 5, the ring gear 2 is a combination of three formed bodies corresponding to three regions, which are formed corresponding to three regions into which the whole shape of the ring gear 2 is radially divided. Specifically, the ring gear 2 is constituted of a race side-region formed body 26, which corresponds to an innermost, race side region, a gear side-region formed body 28, which corresponds to an outermost, gear side region, and an intermediate region formed body 30, which corresponds to an intermediate region that connects the race side-region formed body 26 and the gear side-region formed body 28.

The race side-region formed body 26 is as shown in FIGS. 6A to 6E, and includes a flat-shaped ring portion 26*a* that connects one edge of the cylindrical portion 2*a* and one edge of the inner race portion 2*b* all along the circumference, wherein the inner race portion 2*b* having a smaller diameter is disposed inside the cylindrical portion 2*a* having a larger diameter. FIG. 6A is a front view, FIG. 6B is a rear view, FIG. 6C is a perspective view, FIG. 6D is a right side view, and FIG. 6E is a sectional view taken along the line II-II. Oil-returning holes 26*b*, which penetrate the flat-shaped ring portion 26*a*, are formed at even angular intervals around the axis. Six oil-returning holes 26*b* are provided in this embodiment. The edge of the cylindrical portion 2*a* opposed to the edge thereof provided with the flat-shaped ring portion 26*a* is the portion that is joined to the intermediate region formed body 30. Contact surfaces 26*c* and 26*d*, which are brought into contact with the intermediate region formed body 30, are formed at this portion. The contact surface 26*c* is a circumferential surface at an end of the cylindrical portion 2*a*, and the contact surface 26*d* is a contact surface 26*c*-side surface of a projection 26*e* formed along the circumference.

The gear side-region formed body 28 has a ring shape in which gear teeth are formed on the outer side as shown in FIG. 5. When the gear side-region formed body 28 is incorporated into the ring gear 2, the gear side-region formed body 28 provides the gear portion 2*c*. It should be noted that the inner circumferential surface of the gear side-region formed body 28 is a contact surface 28*a*, which is brought into contact with and joined to the intermediate region formed body 30.

Figure 8A:
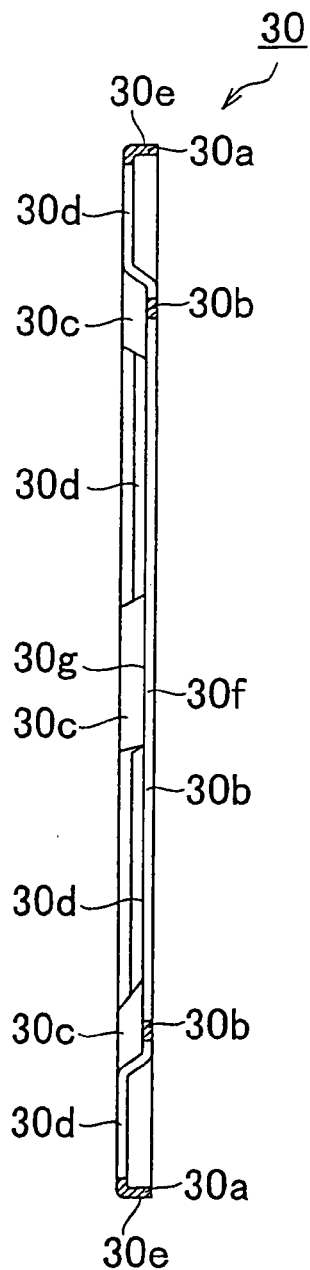
FIGS. 8A and 8B are diagrams for explaining the configuration in section of the intermediate region formed body according to the embodiment.
Figure 8B:
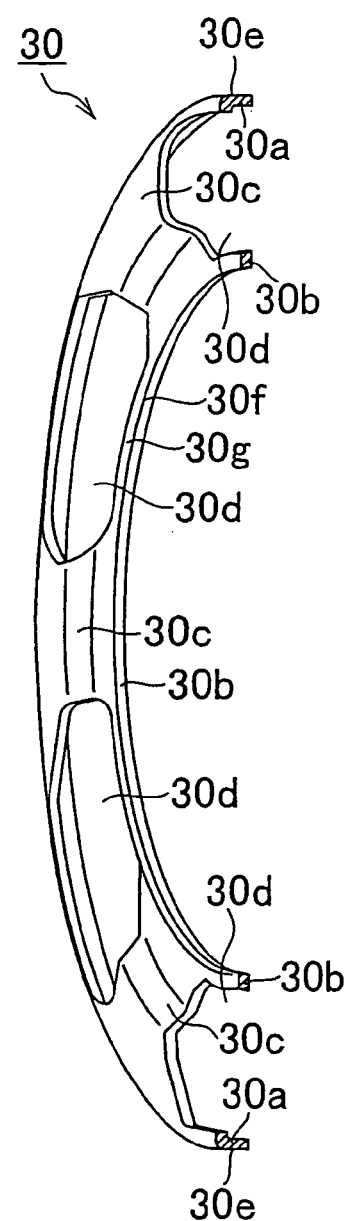

The intermediate region formed body 30, which is as shown in FIGS. 7A to 7D, and FIGS. 8A and 8B, is a formed body corresponding to the intermediate region that connects the race side-region formed body 26 and the gear side-region formed body 28. FIG. 7A is a front view, FIG. 7B is a rear view, FIG. 7C is a perspective view, and FIG. 7D is a right side view. FIG. 8A is a sectional view taken along the line III-III of FIG. 7A, and FIG. 8B is a perspective sectional view taken along the same line. The outer edge of the intermediate region formed body 30 forms a ring-like outer edge portion 30*a* extending parallel to the axis, and the inner edge of the intermediate region formed body 30 forms a ring-like inner edge portion 30*b* extending perpendicular to the axis. Spokes 30*c* for connecting the ring-like outer edge portion 30*a* and the ring-like inner edge portion 30*b* are provided. Six spokes 30*c* are provided in this embodiment, and apertures 30*d* are formed between the spokes 30*c*.

The outer circumferential surface of the ring-like outer edge portion 30*a* serves as a contact surface 30*e* for joining with the gear side-region formed body 28. The inner circumferential surface and the front surface of the ring-like inner edge portion 30*b* serve as contact surfaces 30*f* and 30*g*, respectively, for joining with the race side-region formed body 26.

In manufacturing the ring gear 2, the race side-region formed body 26, the gear side-region formed body 28 and the intermediate region formed body 30 described above are formed by press molding. Then, especially in the race side-region formed body 26, a sprag-retaining surface 26*f* of the inner race portion 2*b* and a fitted surface 26*g* thereof to be fitted onto the ball bearing 12 are finished with high precision. In addition, a seal ring disposition surface 2*d* on the inner side of the cylindrical portion 2*a*, and a seal ring contact surface 2*e* on the outer side of the cylindrical portion 2*a* are finished with high precision.

Figure 10:
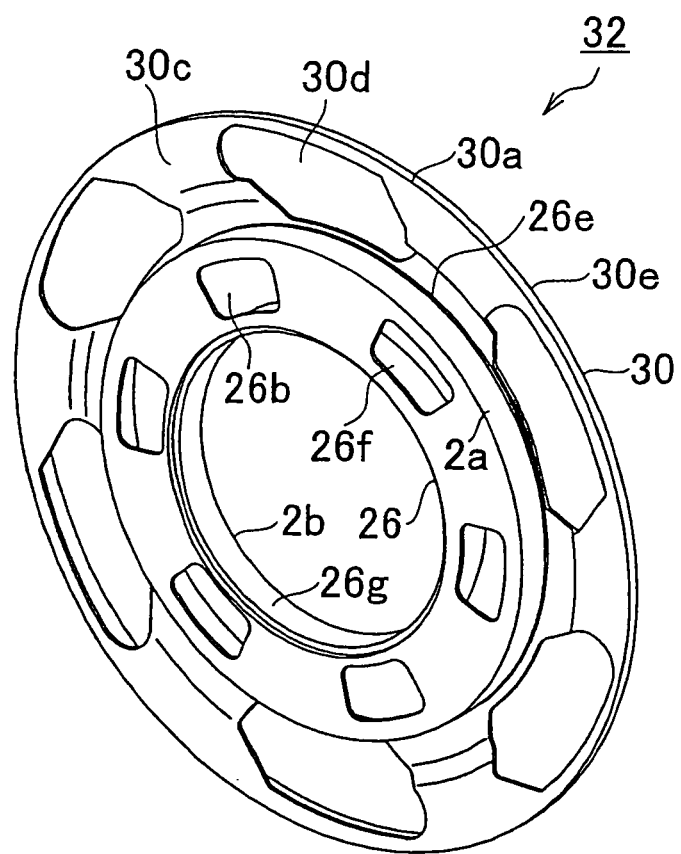
FIG. 10 is a perspective view of a ring gear intermediate according to the embodiment.

As shown in FIG. 9A, the ring-like inner edge portion 30*b* of the intermediate region formed body 30 is fitted to the cylindrical portion 2*a* of the race side-region formed body 26 so as to be brought into contact with the protrusion 26*e* (although tight fitting is adopted in this embodiment, adopting clearance fitting is not problematic). As shown in FIG. 9B, the contact surfaces 30*f* and 30*g* of the ring-like inner edge portion 30*b* are thus brought into contact with the contact surfaces 26*c* and 26*d* of the cylindrical portion 2*a*. As shown in FIG. 9B, the contact interface is welded all along the circumference by electron beam welding using an electron beam welder EB to form a weld m1, whereby the intermediate region formed body 30 is joined to the race side-region formed body 26. Thus, a ring gear intermediate 32 as shown in FIG. 10 is formed. It should be noted that, although electron beam welding is performed all along the circumference between the contact surface 30f of the ring-like inner edge portion 30b and the contact surface 26c of the cylindrical portion 2a, not all the contact interfaces between the race side-region formed body 26 and the intermediate region formed body 30 are welded. Specifically, the contact surface 30g on the front side of the ring-like inner edge portion 30b and the contact surface 26d of the protrusion 26e are merely in contact with each other, that is, not welded.

Figure 11A:
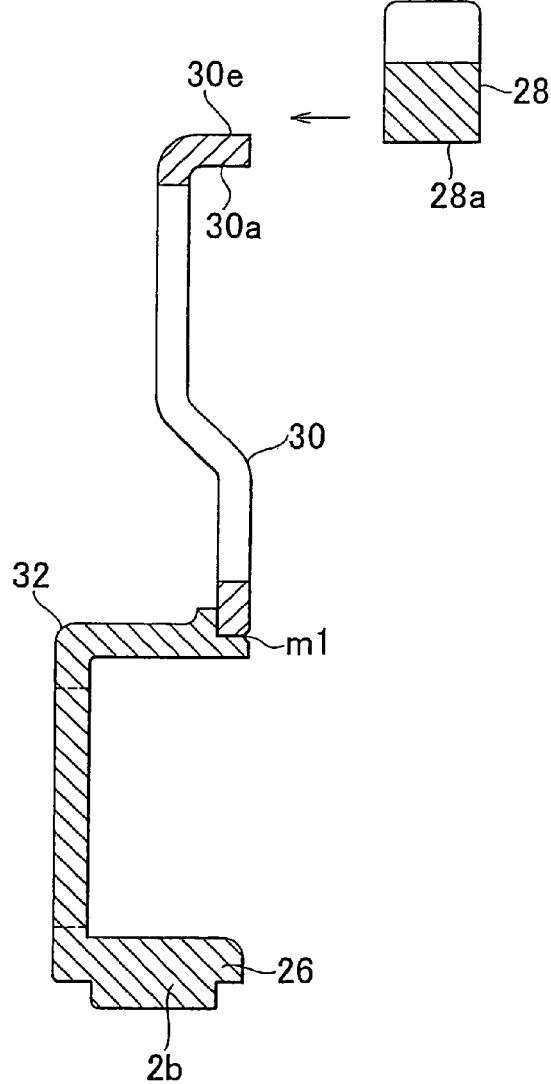
FIGS. 11A and 11B are diagrams for explaining a process of joining the ring gear intermediate and a gear side-region formed body according to the embodiment.
Figure 11B:
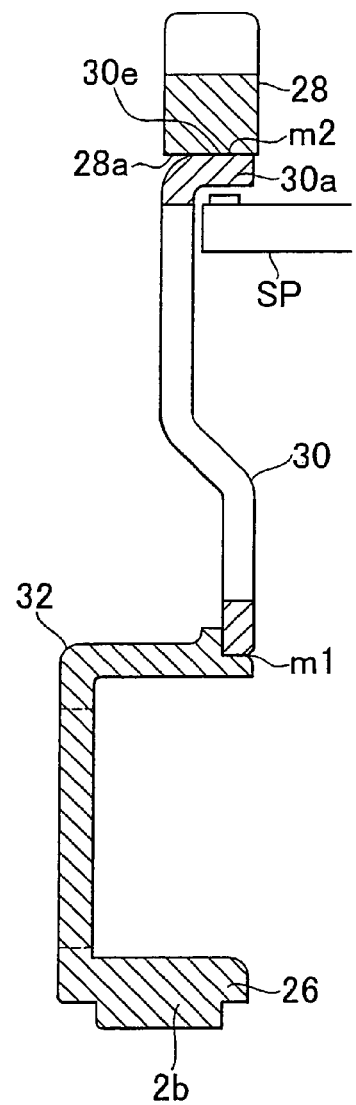

As shown in FIG. 11A, the gear side-region formed body 28 is fitted onto the ring-like outer edge portion 30a of the ring gear intermediate 32. Then, as shown in FIG. 11B, the contact surface 28a on the inner side of the gear side-region formed body 28, and the contact surface 30e of the ring-like outer edge portion 30a of the ring gear intermediate 32, which are in contact with each other after fitting, are joined. In this embodiment, welding is performed at a plurality of points spaced apart along the circumferential direction using a spot welder SP to form welds m2, whereby the ring gear intermediate 32 and the gear side-region formed body 28 are joined together. Thus, the ring gear 2 as shown in FIGS. 3A to 3C, and FIGS. 4A to 4C is completed. Except the spot-welded portions, the contact interface at which the contact surface 28a of the gear side-region formed body 28 and the contact surface 30e of the ring-like outer edge portion 30a are in contact with each other, is not welded, that is, merely in a contact state.

The ring gear 2 thus produced is fixed to the ball bearing 12 with a snap ring 33 as shown in FIG. 1, whereby the ring gear 2 is mounted on the large diameter portion 10 of the crankshaft 4 through the ball bearing 12. It should be noted that, although the inner race portion 2b of the ring gear 2 is engaged with the protrusion of the ball bearing 12 on the side opposite to the snap ring 33, a snap ring may be disposed also on this side instead.

Figure 12D:
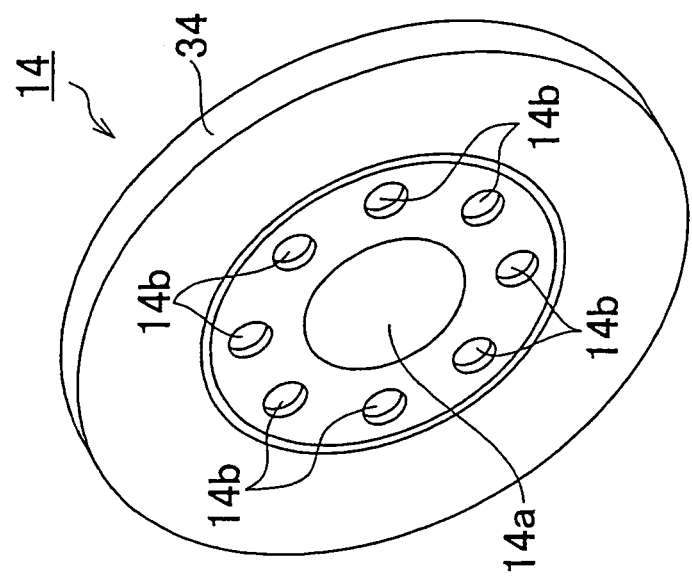
Figure 12E:
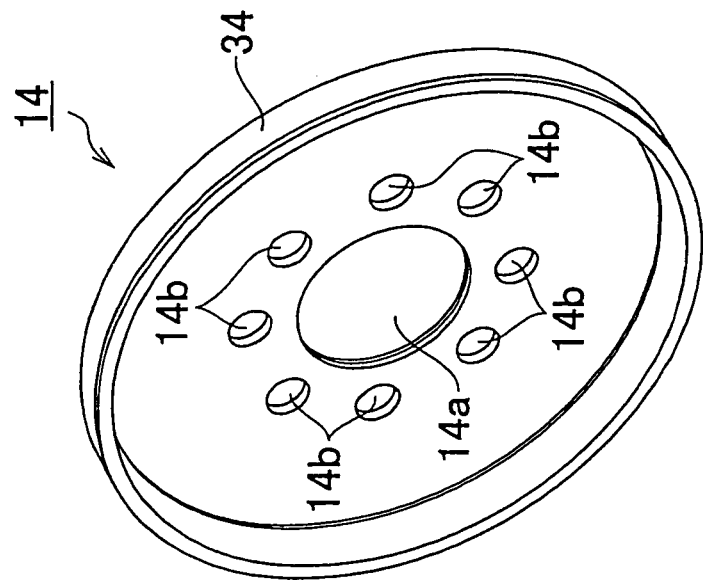

The central portion of the outer race member 14 defines an opening 14a as shown in FIGS. 12A to 12E, and the outer race member 14 has a disc-like shape, in which an outer race portion 34, which may be regarded as the race portion, for the one-way clutch 20 is provided in a right-angled rim shape at the outermost periphery. A plurality of bolt through holes 14b, the number of which is eight in this embodiment, for fastening the outer race member 14 to the large diameter portion 10 of the crankshaft 4 with bolts are provided around the opening 14a. FIG. 12A is a front view, FIG. 12B is a rear view, FIG. 12C is a right side view, FIG. 12D is a perspective view when viewed from a frontal position, and FIG. 12E is a perspective view when viewed from a rear position.

The outer race member 14 is combined with the ring gear 2 that is previously fixed to the large diameter portion 10 with the ball bearing 12 interposed therebetween, by fixing the outer race member 14 onto the rear side surface of the large diameter portion 10 of the crankshaft 4 as shown in FIG. 1. In this case, the outer race portion 34 located at the outer edge of the outer race member 14 is positioned so as to radially face the inner race portion 2b, the inner race portion 2b being located at the inner edge of the ring gear 2. When or before the outer race portion 34 is positioned, sprags 20a and cages 20b are disposed on the sprag-retaining surface 26f of the inner race portion 2b, and the sprags 20a and the cages 20b are held between the inner race portion 2b and the outer race portion 34. In this way, the one-way clutch 20 is constructed.

During the rotation in one direction (the direction indicated by the arrow Ay in FIG. 2) in which the torque from the starter motor 22 is transmitted from the ring gear 2 to the outer race member 14, the thus constructed one-way clutch 20 causes the outer race member 14 and the ring gear 2 to engage with each other. Thus, it is possible to perform cranking by rotating the crankshaft 4 using the output from the starter motor 22. When the internal combustion engine starts to operate, and the output from the internal combustion engine makes the speed of rotation of the outer race member 14, which rotates with the crankshaft 4, faster than the speed of rotation of the ring gear 2 that is caused by the output from the starter motor 22, the direction of rotation of the ring gear 2 relative to the outer race member 14 is reversed. As a result, the one-way clutch 20 is brought into a disengaged state, and it becomes possible to stop the starter motor 22 after the internal combustion engine is started, even when the pinion 24 and the ring gear 2 are always engaged.

As shown in FIG. 1, in order to provide lubrication for the ball bearing 12 and the one-way clutch 20, lubricant Oj is sprayed onto the ball bearing 12 through an oil passage 6a in the cylinder block 6 as shown by the arrow in FIG. 1. In addition, lubricant Or is supplied to the sliding surface of the journal 4b of the crankshaft 4 through an oil passage in the cylinder block 6 and the crankshaft 4, and part of the lubricant Or flows toward the ball bearing 12. The lubricant Oj and Or supplied to the ball bearing 12 passes through the ball bearing 12, and flows into the one-way clutch 20. The lubricant that flows out of the one-way clutch 20 passes through the oil-returning hole 26b formed in the race side-region formed body 26, and is returned to an oil pan 36.

A first seal ring 38 and a second seal ring 40 are used to prevent the lubricant Oj and Or from leaking out. The first seal ring 38 is fitted into the disposition surface 2d on the inner circumferential surface-side of the cylindrical portion 2a formed in the race side-region formed body 26, whereby the first seal ring 38 is fixed to the ring gear 2. A seal lip 38a formed on the inner side of the first seal ring 38 is slidably in contact with a seal sliding surface 34a that is the outer surface of the outer race portion 34. Thus, the first seal ring 38 provides sealing against oil between the outer race member 14 and the ring gear 2.

The second seal ring 40 is disposed on the side (outer side) of the cylindrical portion 2a opposite to the first seal ring 38 side. It should be noted that the second seal ring 40 is disposed on the internal combustion engine side before the ring gear 2 is installed. Above the crankshaft 4, the second seal ring 40 is mainly fitted into the inner surface of an arc-shaped seal fit portion 6b of the cylinder block 6, which may be regarded as the internal combustion engine body side member. On the other hand, below the crankshaft 4, the second seal ring 40 is mainly fitted into the inner surface of an arc-shaped seal fit portion 36a at a rear end portion of the oil pan 36, which may be regarded as the internal combustion engine body side member. Thus, the second seal ring 40 is fixed at the position illustrated. When the ring gear 2 is fitted to the large diameter portion 10, a seal lip 40a formed on the inner side of the second seal ring 40 is slidably in contact with the contact surface 2e, which is the outer circumferential surface of the cylindrical portion 2a formed in the race side-region formed body 26. Thus, sealing against oil between the ring gear 2 and the internal combustion engine is provided.

In relation to the internal combustion engine-starting torque-transmission mechanism constructed as described above, the starter motor 22 and the pinion 24 that have already been incorporated into a starter motor assembly are disposed on an internal combustion engine so that the pinion 24 is engaged with the gear teeth formed at the periphery of the gear portion 2c as shown in FIG. 2. In this way, the internal combustion engine-starting torque-transmission mechanism of constant mesh-type is completed.

When the present invention is applied to an internal combustion engine that requires a ring gear having a diameter larger than that of the ring gear 2 described above, the same race side-region formed body 26 may be used with an intermediate region formed body 30 having increased outer diameter and a gear side-region formed body 28 with increased inner and outer diameters. Thus, it is possible to use a common part for the race side-region formed body 26 even in engines that require a larger diameter ring gear without changing the configuration of the race side-region formed body 26. Otherwise, a different type of engine may be dealt with by using common parts for the race side-region formed body 26 and the intermediate region formed body 30, and increasing the outer diameter of the gear side-region formed body 28.

Similarly, if the internal combustion engine requires a ring gear having a diameter smaller than that of the ring gear 2 described above, the same race side-region formed body 26 may be used with an intermediate region formed body 30 with a reduced outer diameter and gear side-region formed body 28 with reduced inner and outer diameters. In this way, it is possible to use a common part for the race side-region formed body 26 in an engine that requires a smaller diameter ring gear, without changing the configuration of the race side-region formed body 26.

Similarly, with regard to the spokes 30c formed in the intermediate region formed body 30, if the internal combustion engine requires a different configuration of the spokes 30c, it is possible to use the same parts for the race side-region formed body 26 and the same gear side-region formed body 28 with only the intermediate region formed body 30 changed.

According to the above-described embodiment, the following effects can be obtained. (1) The ring gear 2 is formed by joining the regionally formed bodies (the race side-region formed body 26, the gear side-region formed body 28, and the intermediate region formed body 30) that are separately formed corresponding to the regions present along the radial direction, at the respective inter-region joint portions. The weld m1 (FIG. 1, FIGS. 9A and 9B, and FIGS. 11A and 11B) at the interfaces between the contact surfaces 26c and 26d, and the contact surfaces 30f and 30g may be regarded as the inter-region joint portion at which the race side-region formed body 26 and the intermediate region formed body 30 are joined. The weld m2 (FIG. 1, and FIGS. 11A and 11B) at the interface between the contact surfaces 28a and 30e may be regarded as the inter-region joint portion at which the gear side-region formed body 28 and the intermediate region formed body 30 are joined.

Accordingly, it is made possible to perform processing of the race portion (the inner race portion 2b) of the race side-region formed body 26 with no other regionally formed body (neither the gear side-region formed body 28 nor the intermediate region formed body 30) present. Thus, processing is performed on a regionally formed body (the race side-region formed body 26) of relatively small size. For this reason, even when the size and the shape of the race side-region formed body 26 are different depending on the type of internal combustion engine, the difference is within a relatively narrow range, and it is therefore possible to minimize changes in processing apparatuses (presses, grinding and finishing machines, etc.) and processing procedures.

In particular, by causing the other regionally formed bodies (the gear side-region formed body 28 and the intermediate region formed body 30) to absorb the difference depending on the type of engine, it is possible to standardize the size and the shape of the race side-region formed body 26 for various engine types as described above. Thus, it is possible to provide a ring gear 2 with which, even when the size and the shape of the ring gear 2 are different depending on the type of internal combustion engine, changes in processing apparatuses and processing procedures are minimized, and degradation in processing precision is not caused.

(2) In addition to the race portion (inner race portion 2b), formed on the race side-region formed body 26 are the disposition surface 2d on which the first seal ring 38 for providing sealing against oil between the race side region formed body 26 and the outer race member 14 is disposed, and the contact surface 2e with which the second seal ring 40 for providing sealing against oil between the race side-region formed body 26 and the internal combustion engine body side member (the cylinder block 6 and the oil pan 36) is in contact. Thus, it is made possible to perform processing of the inner race portion 2b, as well as the disposition surface 2d and the contact surface 2e for the seal rings 38 and 40 with no other regionally formed body (neither the gear side-region formed body 28 nor the intermediate region formed body 30) present.

Thus, the processing of the inner race portion 2b, as well as the disposition surface 2d and the contact surface 2e for the seal rings 38 and 40 is performed on a regionally formed body (the race side-region formed body 26) of relatively small size. For this reason, even when the size and the shape of the race side-region formed body 26 are different depending on the type of internal combustion engine, the difference is within a relatively narrow range, and it is therefore possible to minimize changes in processing apparatuses and processing procedures. In particular, by causing the other regionally formed bodies (the gear side-region formed body 28 and the intermediate region formed body 30) to absorb the difference depending on the type of engine, it is possible to standardize the size and the shape of the race side-region formed body 26 for various engine types.

In addition, because the inner race portion 2b, as well as the disposition surface 2d and the contact surface 2e for the seal rings 38 and 40 are formed on the same regionally formed body, it is possible to finish the surfaces with precise positional relationship between the inner race portion 2b, the disposition surface 2d and the contact surface 2e. Thus, it is possible to provide a ring gear 2 with which, even when the size and the shape of the ring gear 2 are different depending on the type of internal combustion engine, changes in processing apparatuses and processing procedures are minimized, and degradation in processing precision is not caused.

(3) In the race side-region formed body 26, the contact surface 2e of the second seal ring 40 is the outermost periphery, and an edge portion of the contact surface 2e is the inter-region joint portion (weld m1) at which the intermediate region formed body 30 is joined. The inter-region joint portion can be easily formed by electron beam welding after fitting the ring-like inner edge portion 30b, which is the innermost edge of the intermediate region formed body 30, onto the edge portion of the contact surface 2e.

The outside surface (contact surface 30e) of the ring gear intermediate 32 thus formed is used to form the inter-region joint portions (welds m2) at which the ring gear intermediate 32 is joined to the gear side-region formed body 28. The inter-region joint portion can be easily formed by spot welding after fitting the gear side-region formed body 28 onto the contact surface 30e. In this way, the ring gear 2 is completed. As described above, the plurality of regionally formed bodies 26, 28 and 30 are easily assembled into the ring gear 2.

(4) At the inter-region joint portion at which the race side-region formed body 26 and the intermediate region formed body 30 are joined, and the inter-region joint portion at which the intermediate region formed body 30 (or the ring gear intermediate 32) and the gear side-region formed body 28 are joined, joining is accomplished by joining the regionally formed bodies 26, 28 and 30 with part of the contact surfaces 26c, 26d, 30f, 30g, 30e and 28a left unjoined.

Thus, there are the portions of the contact surfaces 26c, 26d, 30f, 30g, 30e and 28a at the interfaces between the regionally formed bodies 26, 28 and 30, the portions being not joined actually. Accordingly, the noise, such as the gear mesh sound produced by the ring gear 2 when starting torque is transmitted from the starter motor 22 through the pinion 24, is transformed into thermal energy at the unjoined portion of the contact interface, whereby the noise is absorbed. In particular, the joint portions at which the intermediate region formed body 30 (or the ring gear intermediate 32) and the gear side-region formed body 28 are joined are partial joint portions, which are very close to the area at which the pinion 24 and the gear portion 2c mesh with each other. Thus, the gear mesh sound produced at the gear portion 2c is immediately transformed into friction heat at the contact interface between the intermediate region formed body 30 and the gear side-region formed body 28. Accordingly, transmission of the gear mesh sound to the intermediate region formed body 30 and the race side-region formed body 26 is hindered, and the emitted sound is thus reduced, whereby it is possible to effectively reduce the noise at the time of engine start.

(a) In the above embodiment, the ring gear 2 is produced by joining three bodies of the race side-region formed body 26, the gear side-region formed body 28 and the intermediate region formed body 30 after these bodies are separately formed. Otherwise, two regionally formed bodies of the race side-region formed body 26 and the other regionally formed body (a formed body into which the gear side-region formed body 28 and the intermediate region formed body 30 are joined) may be separately formed, and then, a ring gear may be produced by joining the two bodies. Alternatively, two regionally formed bodies of the gear side-region formed body 28 and the other regionally formed body (a formed body into which the race side-region formed body 26 and the intermediate region formed body 30 are joined) may be separately formed, and then, a ring gear may be produced by joining the two bodies.

(b) Although, in the above embodiment, the race side-region formed body 26 and the intermediate region formed body 30 are joined by electron beam welding, these bodies may be joined by another joining method. As fusion welding methods other than the electron beam welding, for example, laser welding or thermal spraying may be adopted to perform welding. Brazing may be used to perform joining.

The intermediate region formed body 30 and the gear side-region formed body 28 may be welded by electron beam welding, laser welding or thermal spraying, instead of spot welding. Brazing may be used to perform joining. In this case, instead of joining partially, the entire circumference may be joined.

(c) In the above embodiment, instead of separately providing the outer race member 14, the flywheel (or driveplate) 16 may be used also as the outer race member 14. Specifically, a configuration may be adopted in which the flywheel (or driveplate) 16 and the outer race member 14 are integrated by providing the flywheel (or driveplate) 16 with the outer race portion 34 of the one-way clutch 20. In this case, the flywheel (or driveplate) may be regarded as the outer race member.

While the invention has been-described with reference to example embodiments thereof, it is to be understood that the invention is not limited to the described embodiments or constructions. To the contrary, the invention is intended to cover various modifications and equivalent arrangements. In addition, while the various elements of the described embodiments are shown in various example combinations and configurations, other combinations and configurations, including more, less or only a single element, are also within the spirit and scope of the invention.

The invention claimed is:

1. A ring gear that transmits starting torque output from a starter motor to a crankshaft side member, which rotates with a crankshaft of an internal combustion engine, through a one-way clutch, the ring gear comprising:
a plurality of regionally formed bodies that are separately formed corresponding to at least two regions that include a race side region including one race portion of the one-way clutch, and a gear side region to which the starting torque is transmitted from the starter motor via gear mesh, wherein a whole shape of the ring gear is radially divided into the at least two regions; and
an inter-region joint portion joining the regionally formed bodies,
wherein the regionally formed bodies are separately formed corresponding to three regions of the race side region, the gear side region, and an intermediate region that is a region between the race side region and the gear side region, wherein the whole shape of the ring gear is divided into the three regions.

2. The ring gear according to claim 1, wherein
a disposition surface on which a first seal ring is disposed or a contact surface with which the first seal ring is in contact is formed on the race side-region formed body corresponding to the race side region, the first seal ring provides a seal against oil between the race side-region formed body and the crankshaft side member.

3. The ring gear according to claim 1, wherein
a disposition surface on which a second seal ring is disposed or a contact surface with which the second seal ring is in contact is formed on the race side-region formed body corresponding to the race side region, the second seal ring provides a seal against oil between the race side-region formed body and an internal combustion engine body-side member.

4. The ring gear according to claim 2, wherein:
the race side-region formed body corresponding to the race side region has a cylindrical portion extending parallel to the rotational axis of the ring gear, the cylindrical portion is positioned further outward than the one race portion of the one-way clutch;
an inner circumferential surface of the cylindrical portion is the disposition surface or the contact surface for the first seal ring providing sealing against oil between the race side-region formed body and the crankshaft side member; and
an outer circumferential surface of the cylindrical portion is the disposition surface or the contact surface for the second seal ring providing sealing against oil between the race side-region formed body and the internal combustion engine body-side member.

5. The ring gear according to claim 2, wherein
an outermost periphery of the race side-region formed body is the disposition surface or the contact surface for any one of the first and second seal rings, and
an innermost edge portion of one of the regionally formed body among the plurality of regionally formed bodies except for the race side region formed body is joined to an edge portion of the outermost periphery of the race side region formed body through the inter-region joint portion.

6. The ring gear according to claim 1, wherein at least one inter-region joint portion is formed by welding.

7. The ring gear according to claim 6, wherein the welding is such that a contact interface between the regionally formed bodies to be welded is partially left unwelded.

8. The ring gear according to claim 1, wherein the crankshaft side member includes the other race portion of the one-way clutch, and
the one-way clutch is formed so that the other race portion radially faces the one race portion of the one-way clutch in the race side region.

9. The ring gear according to claim 8, wherein the one race portion is disposed radially inside the other race portion.

10. The ring gear according to claim 1, wherein, the ring gear is always in mesh with the pinion of the starter motor once installed in the internal combustion engine.

11. An internal combustion engine-starting torque-transmission mechanism for transmitting starting torque from a starter motor to a crankshaft of an internal combustion engine, the mechanism comprising the ring gear according to claim 1.

12. A method of manufacturing the ring gear according to claim 1, comprising:
forming all the regionally formed bodies, wherein at least the race side-region formed body has a common shape independently of the type of internal combustion engine, wherein at least one of the regionally formed bodies other than the race side-region formed body has a shape adapted to the internal combustion engine of a particular type; and
joining the regionally formed bodies by a joining process.

13. The ring gear according to claim 1, wherein the race side region, the gear side region and the intermediate region collectively form the ring gear whose whole shape is circular.

14. The ring gear according to claim 1, wherein the gear side region surrounds the race side region.

* * * * *

UNITED STATES PATENT AND TRADEMARK OFFICE
CERTIFICATE OF CORRECTION

PATENT NO. : 8,413,628 B2
APPLICATION NO. : 12/308218
DATED : April 9, 2013
INVENTOR(S) : Tomoaki Suzuki et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,154 days.

Signed and Sealed this
Twentieth Day of August, 2013

Teresa Stanek Rea
*Acting Director of the United States Patent and Trademark Office*